(12) United States Patent
Fukushima et al.

(10) Patent No.: US 8,342,835 B2
(45) Date of Patent: Jan. 1, 2013

(54) SEAL-RING SHAPE FORMING APPARATUS

(75) Inventors: Atsushi Fukushima, Fukushima (JP);
Toshiyuki Kido, Fukushima (JP);
Toshihiro Amano, Fukushima (JP);
Takahiro Saeki, Kanagawa (JP)

(73) Assignee: Nok Corporation, Tokyo (JP)

( * ) Notice: Subject to any disclaimer, the term of this patent is extended or adjusted under 35 U.S.C. 154(b) by 0 days.

(21) Appl. No.: 13/546,240

(22) Filed: Jul. 11, 2012

(65) Prior Publication Data

US 2012/0294972 A1   Nov. 22, 2012

Related U.S. Application Data

(62) Division of application No. 12/477,309, filed on Jun. 3, 2009, now Pat. No. 8,245,398.

(30) Foreign Application Priority Data

Mar. 4, 2009 (JP) .................................. 2009-050895

(51) Int. Cl.
*B29C 35/00* (2006.01)
*B29C 33/00* (2006.01)
*B29C 45/73* (2006.01)
*B21D 53/84* (2006.01)

(52) U.S. Cl. ................. 425/384; 425/DIG. 47; 264/327; 29/888.3; 29/DIG. 24

(58) Field of Classification Search ................. 264/326, 264/327; 277/631, 496–499; 425/DIG. 47
See application file for complete search history.

(56) References Cited

U.S. PATENT DOCUMENTS

| 2,542,593 | A  | 2/1951 | Henry |
| H671 | H | 9/1989 | Cho et al. |
| 7,341,256 | B2 | 3/2008 | Nakaoka et al. |
| 2009/0179388 | A1 | 7/2009 | Uhlenkamp et al. |

FOREIGN PATENT DOCUMENTS

| JP | 2-35088 | 2/1990 |
| JP | 06-193736 | 7/1994 |
| JP | 2729886 | 3/1998 |
| JP | 2002-089718 | 3/2002 |
| JP | 2002-372153 | 12/2002 |
| JP | 3894752 | 3/2007 |

*Primary Examiner* — Sarang Afzali
(74) *Attorney, Agent, or Firm* — Harness, Dickey & Pierce, P.L.C.

(57) ABSTRACT

A seal ring whose abutment joint portion is opened is fitted into an annular gap while the abutment joint portion is substantially closed. The annular gap is formed between an inner circumferential surface of a hole portion provided in an outer circumferential jig and an outer circumferential surface of an inner circumferential jig disposed in the hole portion, and has a heating region and a cooling region. The seal ring is passed through the heating region and then passed through the cooling region in the annular gap. The outer circumferential jig and the inner circumferential jig are maintained at a constant temperature higher than a glass transition temperature of a resin material for the seal ring in the heating region, and maintained at a constant temperature lower than the glass transition temperature of the resin material for the seal ring in the cooling region.

5 Claims, 10 Drawing Sheets

| SHAPE FORMING APPARATUS | | ROUNDNESS TYPE | | ELLIPSOIDAL TYPE | |
| --- | --- | --- | --- | --- | --- |
| FREE OUTER DIAMETER EVALUATION POSITION | | AVERAGE VALUE | MAXIMUM VALUE | AVERAGE VALUE | MAXIMUM VALUE |
| FREE OUTER DIAMETER | AVE | 49.736 | 49.852 | 49.684 | 49.737 |
| | MAX | 49.766 | 49.925 | 49.711 | 49.760 |
| | MIN | 49.712 | 49.789 | 49.651 | 49.708 |

SEAL-RING SHAPE FORMING APPARATUS

CROSS-REFERENCE TO RELATED APPLICATIONS

This application is a divisional of U.S. patent application Ser. No. 12/477,309, filed on Jun. 3, 2009, now U.S. Pat. No. 8,245,398, which claims the benefit and priority of JP 2009-050895, filed on Mar. 4, 2009. The entire disclosures of each of the above applications are incorporated herein by reference.

FIELD

The present invention relates to a technique of forming a synthetic-resin seal ring in a specific shape such that abutment joint ends of the seal ring face each other with a predetermined gap. The seal ring is molded such that the abutment joint ends, which provided at one point on a circumference of the seal ring and can be joined to each other, are separated from each other.

BACKGROUND

This section provides background information related to the present disclosure which is not necessarily prior art.

The synthetic-resin seal ring is applied to various instruments including a hydraulic machine in order to seal a liquid, maintain a pressure, and so on. The synthetic-resin seal ring is attached to an annular groove formed in an outer circumferential surface of a shaft to seal an annular gap between the outer circumferential surface of the shaft and a shaft hole into which the shaft is inserted or an inner circumferential surface of a cylinder.

In the synthetic-resin seal ring, usually an abutment joint portion is provided at one point on a circumference of the seal ring in order to enhance an attaching property. Various shapes such as so-called straight cut, bias cut, and step cut are well known as the shape of the abutment joint portion, and the seal ring is molded such that the abutment joint portion thereof is in an opened state (the abutment joint ends thereof are separated from each other).

While the abutment joint portion is in the opened state, an outer diameter of the seal ring is larger than an inner diameter of the attaching space. Therefore, in order to improve an easiness of attaching the seal ring in the attaching space and to stabilize a posture or position of the seal ring in the attaching space to exert a sufficient sealing function, the seal ring is deformed to a specific shape (reduced-diameter deformation) such that the abutment joint portion is in a closed state (the abutment joint ends are substantially joined to each other) in a natural state.

Various methods are well known as the seal-ring shape forming method (for example, see Japanese Patent Nos. 3894752 and 2729886, Japanese Utility Model Publication No. 2-35088, and Japanese Patent Application Laid-Open Nos. 2002-372153 and 2002-89718). For example, there is well known a method, in which plural products (seal rings) are assembled in a cylindrical jig while diameters of the products are reduced and the whole jig is heated by putting the jig in an electric furnace. However, the following problems are generated in the method.

First it is necessary to evenly heat the whole jig to a certain temperature, and it takes a long time to raise the temperature. Accordingly, when a heating time is shortened, sometimes a temperature difference is generated between regions of the jig, and dimensional accuracy of the shape is varied among the products after the above treatment.

Further, because the method is basically a batch type, the number of members that can be processed in one-time working is restricted, and working efficiency is limited in achieving larger-scale production. Accordingly, in order to increase the number of products that can be processed, it is thought that the jig is enlarged or the number of jigs is increased. However, it is necessary that the electric furnace and the like be enlarged with enlarging jig, and jig put-in work and jig take-out work are increased as the number of jigs is increased.

In cases where the abutment joint portion has the shape in which many joint surfaces are formed between the abutment joint ends like the step cut or composite step cut, because the abutment joint ends are easy to fix by the heating, it is necessary that the process be performed with high accuracy.

SUMMARY

This section provides a general summary of the disclosure, and is not a comprehensive disclosure of its full scope or all of its features.

In view of the foregoing, an object of the invention is to provide a seal-ring shape forming method, a seal-ring shape forming apparatus, and a seal ring, in which the efficiency and accuracy of the shape forming process are improved.

A first aspect according to the invention provides a seal-ring shape forming method by which a synthetic-resin seal ring is formed in a shape such that abutment joint ends of the seal ring face each other with a predetermined gap, the seal ring being molded such that the abutment joint ends are separated from each other, the abutment joint ends being provided at one point on a circumference of the seal ring and able to be joined to each other, the seal-ring shape forming method including a first process of fitting the seal ring into an annular gap while the abutment joint ends face each other with a substantially predetermined gap, the annular gap being formed between an inner circumferential surface of a hole portion provided in an outer circumferential jig and an outer circumferential surface of an inner circumferential jig disposed in the hole portion; a second process of passing the seal ring through a heating region in the annular gap, the outer circumferential jig and the inner circumferential jig being maintained at a constant temperature higher than a glass transition temperature of a resin material for the seal ring in the heating region; and a third process of passing the seal ring passed through the heating region through a cooling region in the annular gap, the outer circumferential jig and the inner circumferential jig being maintained at a constant temperature lower than the glass transition temperature of the resin material for the seal ring in the cooling region.

A second aspect according to the invention provides a seal-ring shape forming apparatus by which a synthetic-resin seal ring is formed in a shape such that abutment joint ends of the seal ring face each other with a predetermined gap, the seal ring being molded such that the abutment joint ends are separated from each other, the abutment joint ends being provided at one point on a circumference of the seal ring and able to be joined to each other, the seal-ring shape forming apparatus including an outer circumferential jig having a hole portion; and an inner circumferential jig that is disposed in the hole portion to form an annular gap between an inner circumferential surface of the hole portion and the inner circumferential jig, wherein a heating region and a cooling region are formed in the annular gap, the outer circumferential jig and the inner circumferential jig being maintained at a constant temperature higher than a glass transition temperature of a resin material for the seal ring in the heating region, the outer circumferential jig and the inner circumferential jig being maintained at a constant temperature lower than the glass transition temperature of the resin material for the seal ring in the cooling region, the seal ring is fitted into the annular gap while the abutment joint ends face each other with a substantially predetermined gap, and the seal ring is sequentially passed through the heating region and the cooling region to form the shape.

A third aspect according to the invention provides a synthetic-resin seal ring formed in a shape such that abutment joint ends of the seal ring face each other with a predetermined gap after the seal ring is molded such that the abutment joint ends are separated from each other, the abutment joint ends being provided at one point on a circumference of the seal ring and able to be joined to each other, wherein, after the molding, the seal ring is fitted into an annular gap while the abutment joint ends face each other with a substantially predetermined gap, the annular gap being formed between an inner circumferential surface of a hole portion provided in an outer circumferential jig and an outer circumferential surface of an inner circumferential jig disposed in the hole portion; the seal ring is passed through a heating region in the annular gap, the outer circumferential jig and the inner circumferential jig being maintained at a constant temperature higher than a glass transition temperature of a resin material for the seal ring in the heating region; and, after passing the heating region, the seal ring is passed through a cooling region in the annular gap to form the shape, the outer circumferential jig and the inner circumferential jig being maintained at a constant temperature lower than the glass transition temperature of the resin material for the seal ring in the cooling region.

According to the first to third aspects of the invention, the seal ring is fitted into the annular gap between the outer circumferential jig and the inner circumferential jig, and the seal ring is passed through the two regions in the annular gap. The two regions are maintained at predetermined temperatures. Therefore, the seal ring can be formed in the specific shape. That is, the seal ring is heated and cooled in the constant temperature environment, and the variation in thermal history is prevented among the products, so that the variation in shape of the seal ring can be prevented among the products to improve the dimensional accuracy of the product.

In the seal-ring shape forming method according to the first to third aspects of the invention, preferably an outer diameter of the inner circumferential jig is set such that a gap is formed between the outer circumferential surface of the inner circumferential jig and the seal ring in which the abutment joint ends face each other with the predetermined gap.

The seal ring molded in the enlarged diameter state in which the abutment joint ends are separated from each other is fitted into the annular gap while the abutment joint ends face each other with the predetermined gap, that is, while the diameter is reduced compared with the shape immediately after the molding. Therefore, because the seal ring tends to restore to the original enlarged diameter state (shape immediately after the molding), the outer circumferential surface of the seal ring is brought into contact with the inner circumferential surface of the hole portion of the outer circumferential jig.

The seal ring fitted into the annular gap is passed through the heating region while brought into contact with the inner circumferential surface of the hole portion of the outer circumferential jig. At this point, the seal ring is heated to the temperature higher than the glass transition temperature of the resin material for the seal ring.

In the seal ring proceeding into the cooling region from the heating region, first the outer circumferential surface side of the seal ring brought into contact with the inner circumferential surface of the hole portion of the outer circumferential jig is rapidly cooled. At this point, the inner circumferential surface side of the seal ring is maintained at the high temperature by the gap provided between the seal ring and the outer circumferential surface of the inner circumferential jig. In the seal ring whose outer circumferential surface side is cooled to the temperature lower than the glass transition temperature of the resin material for the seal ring, density on the outer circumferential surface side is lowered relative to density on the inner circumferential surface side, and a curvature is increased, that is, the diameter is decreased. Therefore, the inner circumferential surface of the seal ring is brought close to the outer circumferential surface of the inner circumferential jig. Although the inner circumferential surface side of the seal ring is maintained at the high temperature immediately before brought close to the inner circumferential jig, when the inner circumferential surface side of the seal ring is brought close to the inner circumferential jig, the inner circumferential surface side of the seal ring is rapidly cooled to lower the density. Therefore, the difference in density is reduced between the inner circumferential surface side and outer circumferential surface side of the seal ring to slightly enlarge the diameter of the seal ring. The seal ring is completely cooled in that condition to end the shape formation.

During the heating process, the abutment joint ends of the seal ring are maintained at the predetermined temperature because the outer circumferential surface of the seal ring is brought into contact with the inner circumferential surface of the hole portion of the outer circumferential jig. During the cooling process, when the outer circumferential surface side of the seal ring is cooled to reduce the diameter of the seal ring, the gap between the abutment joint ends is narrowed, and sometimes the abutment joint ends are brought into contact with each other. However, when the inner circumferential surface side of the seal ring is cooled thereafter to enlarge the diameter of the seal ring again, the gap between the abutment joint ends is expanded again. This action prevents the abutment joint ends from being completely cooled while the abutment joint ends are brought into contact with each other, and whereby the abutment joint ends are prevented from being fixed to each other.

The seal ring is not brought into contact with the inner circumferential jig in the final process of forming the shape, so that the seal ring can relatively easily be taken out from the annular gap.

In the seal-ring shape forming method according to the first to third aspects of the invention, preferably the annular gap is opened on both sides of the outer circumferential jig and the inner circumferential jig in an axial direction, the heating region is provided on one of the sides in the axial direction, and the cooling region is provided on the other side in the axial direction, and the seal ring is fitted into the opening on one of the sides in the axial direction of the annular gap, and discharged from the opening on the other side in the axial direction.

In the seal-ring shape forming method according to the first to third aspects of the invention, preferably a plural seal rings are continuously fitted into the annular gap, and the preceding seal ring is pushed by the subsequent seal ring to move the plural seal rings in the annular gap.

Thus, the shape forming work can continuously be performed to the plural seal rings by continuously fitting the seal rings into the annular gap. Accordingly, the automation of the work is achieved while the working efficiency is improved, and the seal-ring shape forming method, the seal-ring shape forming apparatus, and the seal ring can contribute to the mass production.

Further, because all the seal rings are heated and cooled in the same temperature environment, the difference in thermal history is prevented among the products. Accordingly, the variation in seal-ring shape is prevented among the products after the shape is formed, and the dimensional accuracy of the seal ring can be improved.

In the seal-ring shape forming method according to the first to third aspects of the invention, preferably a section perpendicular to an axis is formed into a substantially ellipsoidal shape in the annular gap, and the seal ring is fitted into the annular gap that positions of the abutment joint ends of the seal ring are substantially matched with a position of one of end points of a minor axis in the ellipsoidal section of the annular gap.

In the injection molding of the seal ring, in case that the mold has two gates, by which the resin material is injected into the mold, respectively provided near the regions for molding the abutment joint ends of the seal ring, the resin material injected via one of two gates and the resin material injected via the other of two gates are merged at an intermediate region between the regions for molding the abutment joint ends, that is, the region of the seal ring opposite to the abutment joint ends of the seal ring. Therefore, when the seal ring is deformed such that the abutment joint ends are brought close to each other after the molding, a strain remains in the region opposite to the abutment joint ends of the seal ring. Under such conditions, even if the seal ring is fixed in the substantially round shape and heated to the temperature higher than the glass transition temperature in the shape forming apparatus, after being discharged from the apparatus, the seal ring is deformed into the ellipsoidal shape such that the abutment joint ends are set to one of end points of a major axis, by the residual stress.

Therefore, in the invention, the annular gap is formed into the ellipsoidal shape, and the shape of the seal ring is formed such that a line connecting the abutment joint ends and the region opposite to the abutment joint ends is substantially matched with the minor axis. Therefore, the seal ring is deformed such that the abutment joint ends and the region opposite to the abutment joint ends are separated from each other by the residual stress (such that the minor axis is extended), so that the seal ring can be formed into the substantially round shape after the shape forming.

Accordingly, the roundness or circularity of the seal ring is improved after the shape is formed, so that the assembling property of the seal ring can be improved.

As described above, in the invention, the efficiency and accuracy of the shape forming process are improved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Exemplary embodiments of the invention will be described with reference to the drawings. A scope of the invention is not limited only to a size, a material, a shape, and a relative disposition of a component described in the embodiment unless otherwise specified. [0032]

First Embodiment

Figure 1:
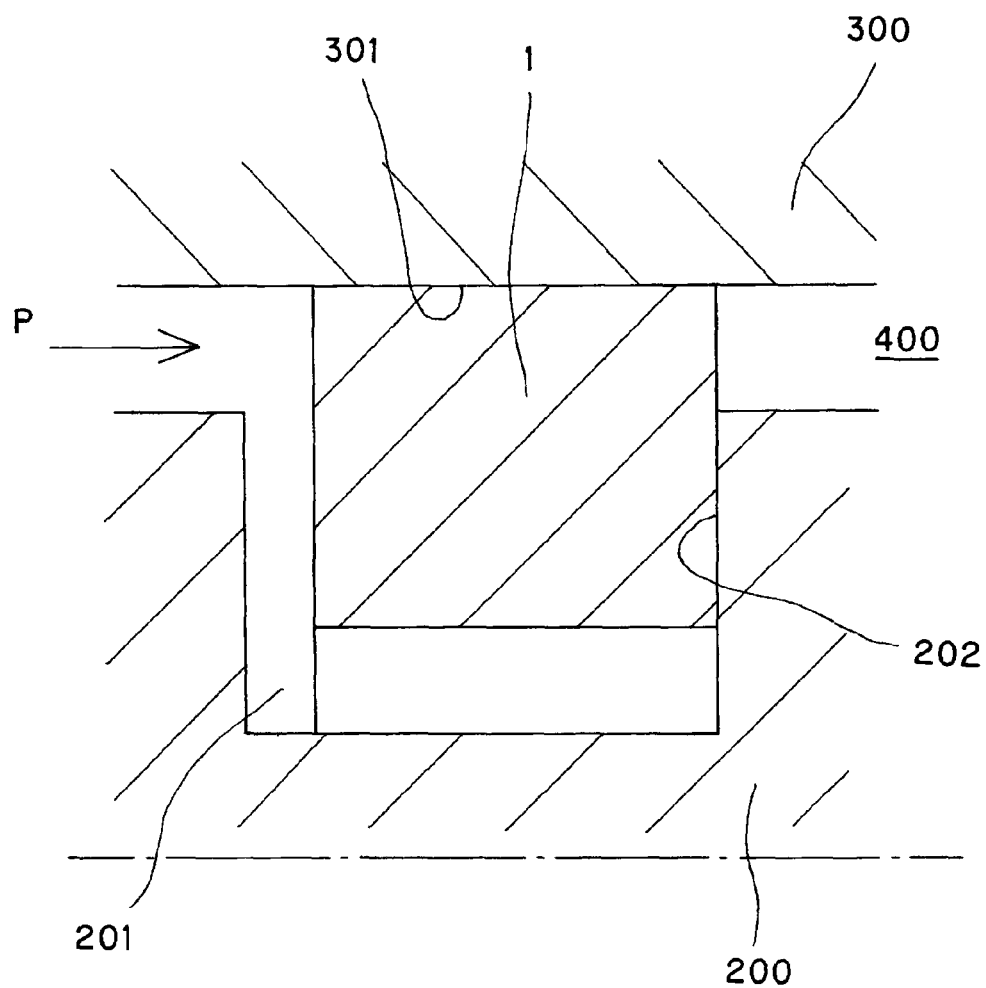
FIG. 1 is a schematically semi-sectional view illustrating usage of a seal ring according to a first embodiment of the invention.
Figure 2A:
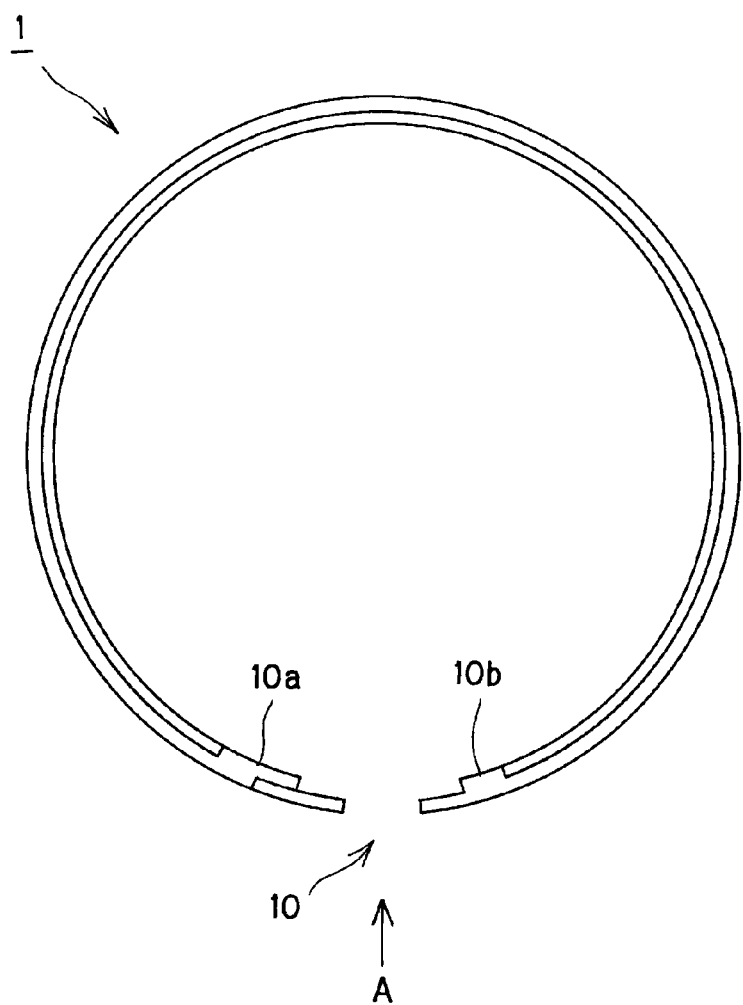
FIGS. 2A and 2B are schematic diagrams illustrating a configuration of the seal ring before a shape is formed.
Figure 2B:
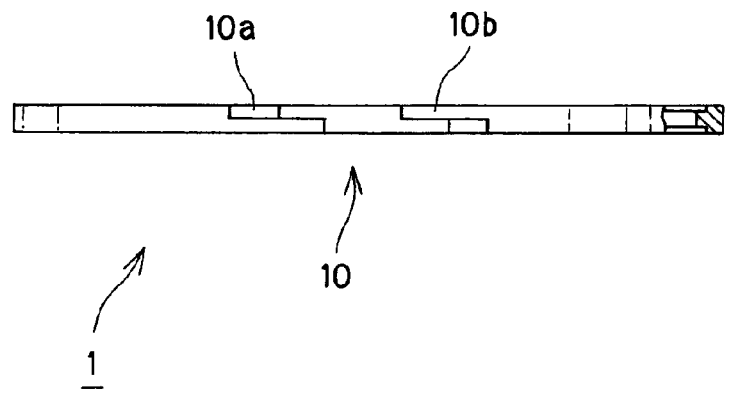
Figure 3A:
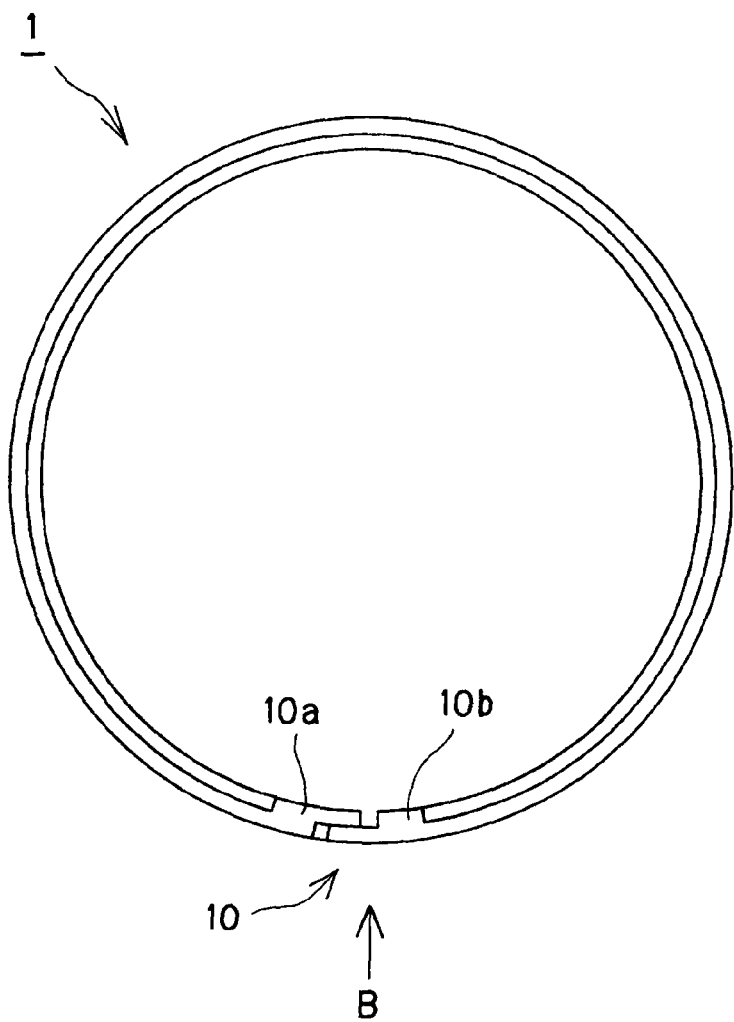
FIGS. 3A and 3B are schematic diagrams illustrating the configuration of the seal ring after the shape is formed.
Figure 3B:
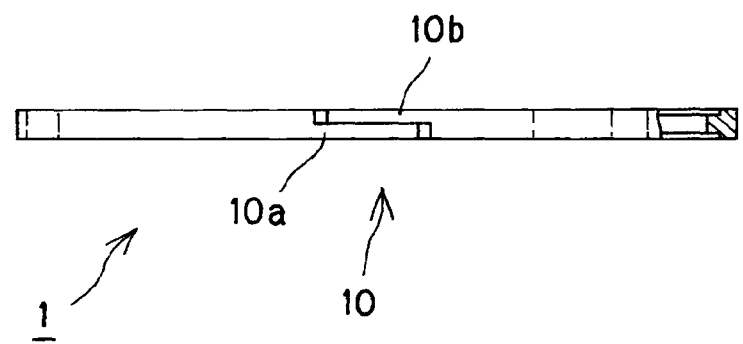
Figure 4:
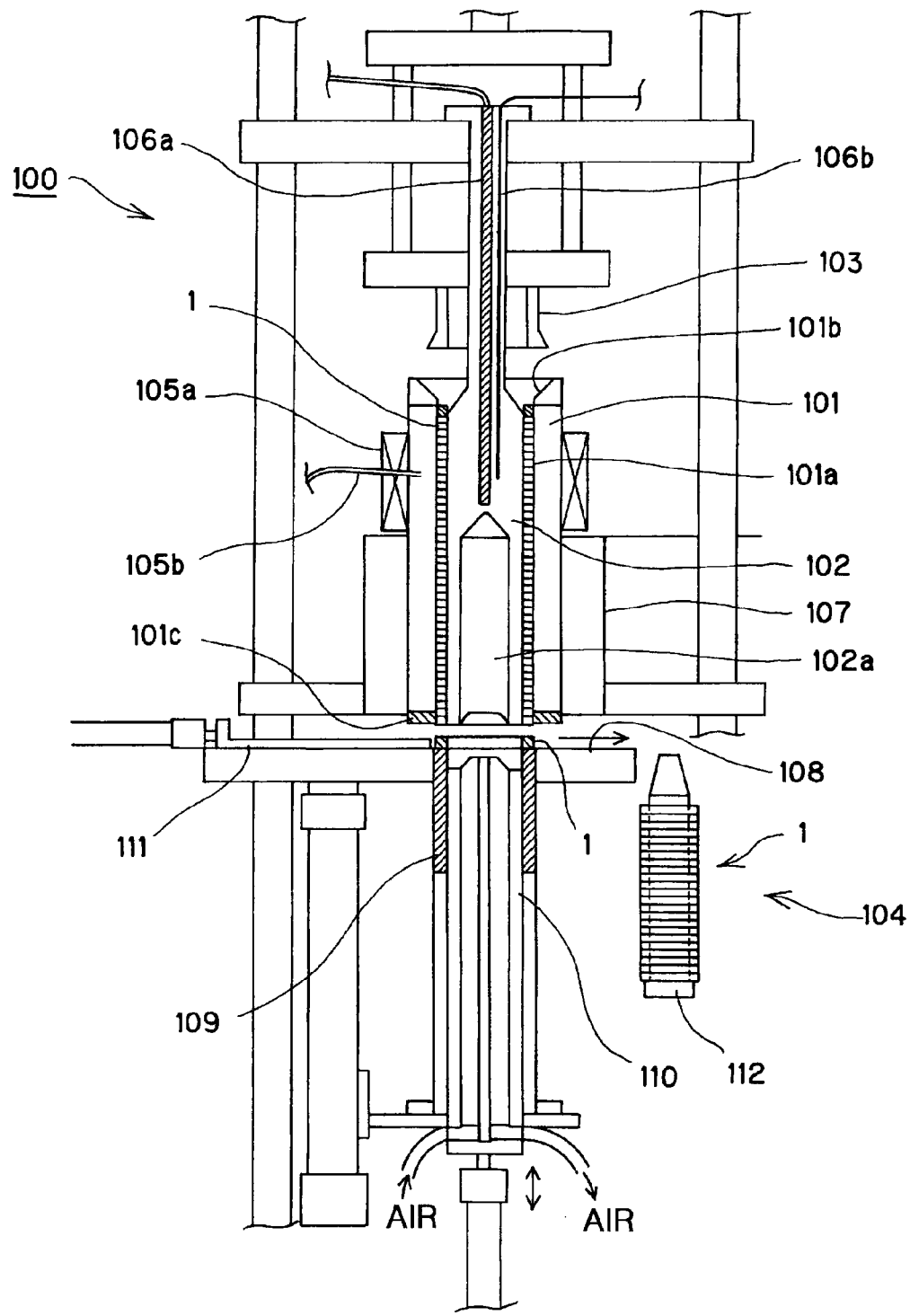
FIG. 4 is a schematic diagram illustrating a configuration of a shape forming apparatus.
Figure 5:
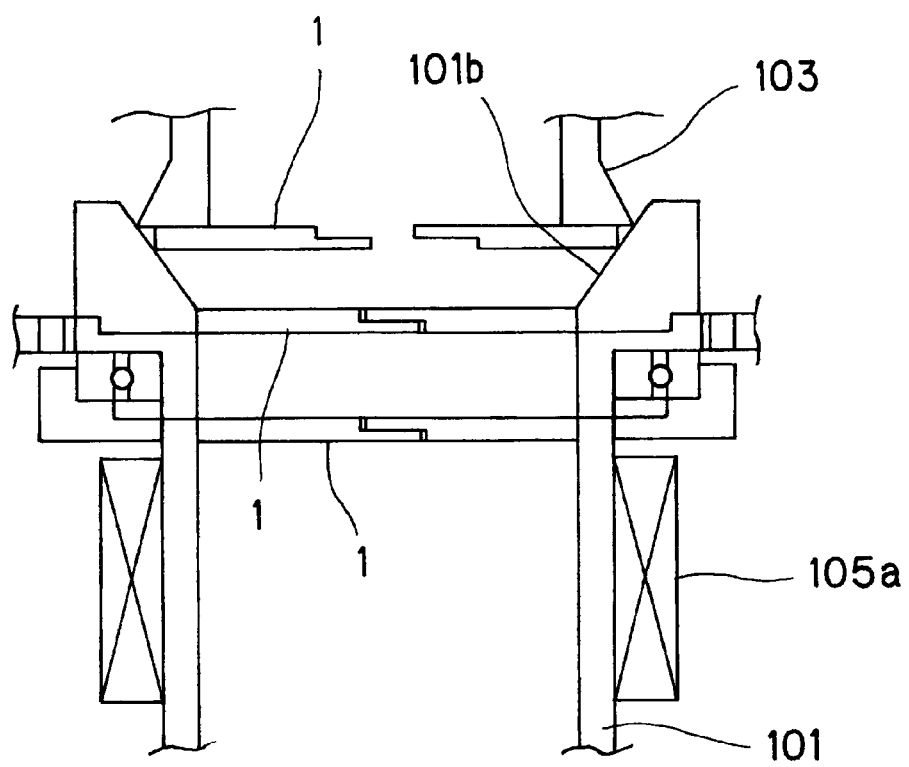
FIG. 5 is a schematic diagram illustrating a configuration of a seal ring feed unit of the shape forming apparatus of FIG. 4.
Figure 6A:
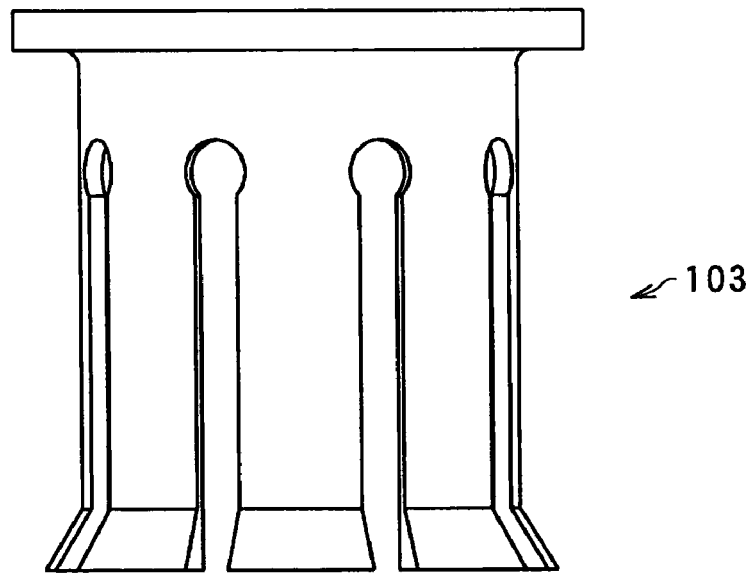
FIGS. 6A and 6B are schematic diagrams illustrating a configuration of a push-in jig of the shape forming apparatus of FIG. 4.
Figure 6B:
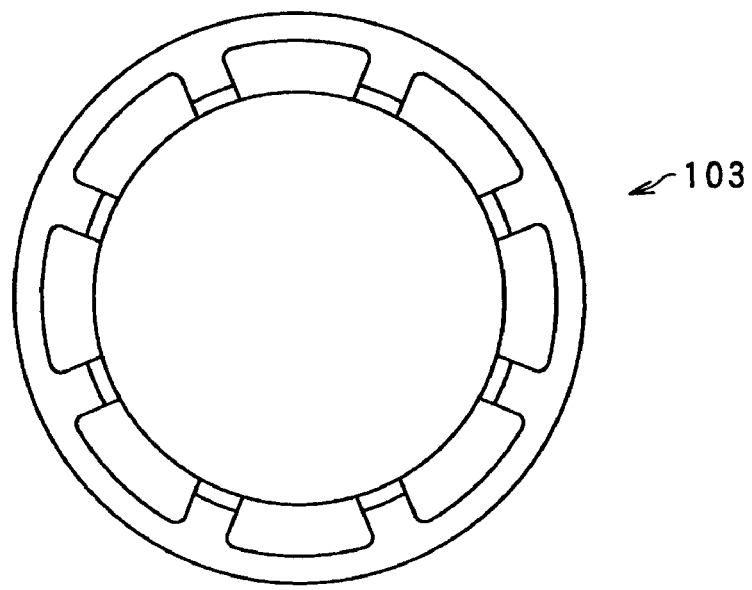
Figure 7:
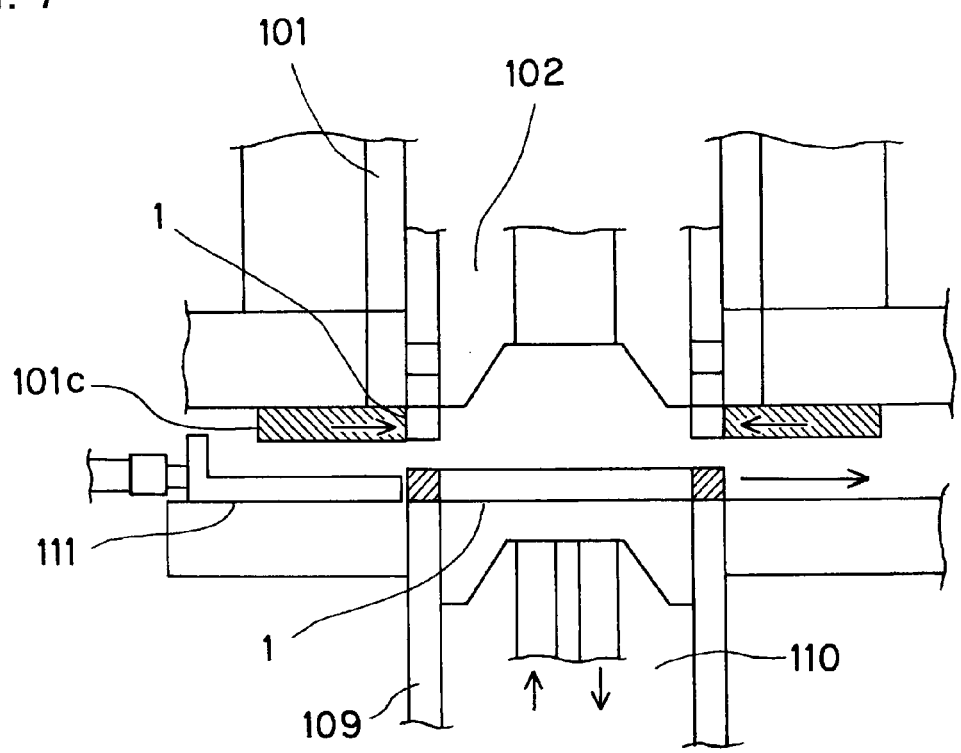
FIG. 7 is a schematic diagram illustrating a configuration of a seal ring discharge unit of the shape forming apparatus of FIG. 4.

A seal-ring shape forming method, a seal-ring shape forming apparatus, and a seal ring according to a first embodiment of the invention will be described with reference to FIGS. 1 to 6. FIG. 1 is a schematically semi-sectional view illustrating usage of the seal ring. FIGS. 2A and 2B are schematic diagrams illustrating a configuration of the seal ring immediately after molding, that is, before the shape is formed, FIG. 2A is a view illustrating the seal ring when viewed from an axial direction, and FIG. 2B is a view illustrating the seal ring when viewed from an arrow A of FIG. 2A. FIGS. 3A and 3B are schematic diagrams illustrating the configuration of the seal ring after the shape is formed, FIG. 3A is a view illustrating the seal ring when viewed from the axial direction, and FIG. 3B is a view illustrating the seal ring when viewed from an arrow B of FIG. 3A. FIG. 4 is a schematic diagram illustrating a configuration of a shape forming apparatus. FIG. 5 is a schematic diagram illustrating a configuration of a seal ring feed unit of the shape forming apparatus of FIG. 4. FIGS. 6A and 6B are schematic diagrams illustrating a configuration of a push-in jig of the shape forming apparatus of FIG. 4, FIG. 6A is a front view of the push-in jig, and FIG. 6B is a bottom view of the push-in jig. FIG. 7 is a schematic diagram illustrating a configuration of a seal ring discharge unit of the shape forming apparatus of FIG. 4.

(Configuration of Seal Ring) Referring to FIG. 1, the seal ring 1 of the first embodiment is used to seal an annular gap 400 between a shaft 200 and a shaft hole 301 of a housing 300, and the seal ring 1 is applied to various instruments such as a hydraulic machine in order to seal a liquid, maintain a pressure, and so on. The seal ring 1 is attached to an annular groove 201 provided in an outer circumferential surface of the shaft 200, the seal ring 1 is pressed against one of sides in an axial direction by a pressure P acting from the other side in the axial direction, and the seal ring 1 is brought close contact with both an inner circumferential surface of the shaft hole 301 and a sidewall surface 202 of the annular groove 201. This enables the annular gap 400 to be sealed.

Referring to FIGS. 2 and 3, the seal ring 1 is formed by a synthetic-resin annular member, an abutment joint portion 10 is provided at one point on a circumference thereof, and the abutment joint portion 10 includes abutment joint ends 10a and 10b that can be joined to each other. The abutment joint portion 10 causes the synthetic-resin seal ring 1 to be easily attached to the annular groove 201. Unlike a rubber ring, the synthetic-resin seal ring is difficult to elastically deform. Further, when a circumferential length of the seal ring 1 is changed by a temperature change, or when an eccentricity is generated between the shaft 200 and the housing 300, the abutment joint ends 10a and 10b move close to or move away from each other to change a joining state of the abutment joint portion 10, so that the change in circumferential length or the eccentricity can be absorbed and the attachment state of the seal ring can be stabilized to maintain the close contact state of the seal surface.

Various abutment joints such as so-called straight cut, bias cut, and step cut can be adopted as the abutment joint portion 10. Among others, composite step cut is adopted in the first embodiment. In the composite step cut, a surface perpendicular to the axis and a surface parallel to the axis are brought into contact with projections of the abutment joint ends.

In the seal ring 1 of the first embodiment, part of a side face is recessed in order to reduce a slide area with a sidewall surface 202 of the annular groove 201.

A resin composition containing a heat-resistant resin and a filler can be cited as an example of a material for the seal ring 1. A crystalline resin exhibiting excellent heat-resistant property, flame-resistant property, chemical-resistant property, and mechanical property is preferably used as the heat-resistant resin. Examples of the crystalline resin include aromatic polyether ketone resins such as a polycyanoarylether resin (PEN) and a polyether ether ketone resin (PEEK), aromatic thermoplastic polyimide resins, polyamide 4-6 resins, polyphenylene sulfide resins, and polytetra fluoroethylene (PTFE) resins. The filler is blended to improve mechanical strength of the material and abrasion resistance and impart low abrasion property. A kind of the filler is not particularly limited.

The seal ring 1 is molded into a basic shape by injection molding. In the seal ring 1 after the injection molding, the abutment joint portion 10 is opened as illustrated in FIG. 2, that is, the abutment joint ends 10a and 10b are separated from each other. At this point, a diameter of the seal ring 1 is larger than a diameter of target specifications of a product.

Accordingly, after the seal ring 1 is molded by the injection molding, a shape forming treatment is conducted (reduced-diameter deformation) such that the abutment joint portion 10 is closed as illustrated in FIG. 3, that is, such that the abutment joint ends 10a and 10b come close to and substantially join to each other. Preferably a predetermined gap is formed between the abutment joint ends 10a and 10b in the closed state of the abutment joint portion 10, and the diameter of the seal ring 1 at this time becomes an outer diameter in the target specifications of the product. As used herein, the predetermined gap shall mean an allowable or preferable gap in the target specifications of the product. The predetermined gap is suitably set from the viewpoints of sealing performance or easiness of assembling in use or followability with the change in circumferential length of the seal ring.

(Configuration of Shape Forming Apparatus)

Referring to FIG. 4, a shape forming apparatus 100 of the seal ring of the first embodiment includes an outer circumferential jig 101 and an inner circumferential jig 102, a push-in jig 103, and a discharge unit 104. The outer circumferential jig 101 and the inner circumferential jig 102 are used to perform heating and cooling processes for forming the shape of the seal ring. The push-in jig 103 is used to push the seal ring 1 into an annular gap between the circumferential jig 101 and the inner circumferential jig 102 after the injection molding. The discharge unit 104 discharges the seal ring 1 after the shape is formed.

The outer circumferential jig 101 includes a hole portion 101a, and the hole portion 101a has an inner circumferential surface having a predetermined diameter. The inner circumferential jig 102 has an outer circumferential surface having a diameter that is smaller than an inner diameter of the hole portion 101a of the outer circumferential jig 101. The outer circumferential jig 101 and the inner circumferential jig 102 are formed into substantially cylindrical shapes, and coaxially disposed such that the inner circumferential surface of the hole portion 101a and the outer circumferential surface of the inner circumferential jig 102 face each other, and the annular gap is formed between the inner circumferential surface of the hole portion 101a and the outer circumferential surface of the inner circumferential jig 102. The seal ring 1 is passed through the annular gap to form the shape of the seal ring 1.

The diameter of the hole portion 101a of the outer circumferential jig 101 and the outer diameter of the inner circumferential jig 102 are suitably set according to the specifications of the seal ring. For example, the diameter of the hole portion 101a and the outer diameter of the inner circumferential jig 102 can be set such that the abnormal deformation caused by the abutment between the abutment joint ends 10a and 10b is prevented when the seal ring 1 is thermally expanded by heating, and such that the desired gap is ensured between the abutment joint ends 10a and 10b when the diameter of the seal ring 1 is reduced. The inner circumferential surface of the hole portion 101a and the outer circumferential surface of the inner circumferential jig 102 have substantially round sections, and the annular gap is formed into the substantially cylindrical shape.

An upper side of the annular gap constitutes a feed port of the seal ring 1, and a tapered surface 101b is formed in an opening of the hole portion 101a at an end on the upper side of the outer circumferential jig 101. A lower side of the annular gap constitutes a discharge port of the seal ring 1, and a clamp 101c is provided in the discharge port in order to prevent drop of the seal ring 1 in which the shape is formed.

In a region near the feed port of the seal ring 1, a cartridge heater 105a and a thermocouple 105b are provided in the outer circumferential surface of the outer circumferential jig 101, and a cartridge heater 106a and a thermocouple 106b are provided inside the inner circumferential jig 102. This region constitutes a heating region where the seal ring 1 is heated in the annular gap.

Below the heating region, that is, in a region far away from the feed port of the seal ring 1 (region near the discharge port), a cooling jacket 107 is provided in the outer circumferential surface of the outer circumferential jig 101, and a cavity 102a that is opened onto the discharge port side is provided in the inner circumferential jig 102. This region constitutes a cooling region where the seal ring 1 is cooled in the annular gap.

The push-in jig 103 is disposed above the annular gap while being able to be lifted and lowered. As illustrated in FIG. 5, because the diameter of the seal ring 1 is larger than the diameter of the annular gap immediately after the injection molding, the seal ring 1 put in the feed port is caught by the tapered surface 101b of the outer circumferential jig 101. The seal ring 1 is pushed in toward the annular gap by the lowering push-in jig 103 while the diameter of the seal ring 1 is gradually reduced along the tapered surface 101b.

In the first embodiment, the push-in jig 103 has a collet shape as illustrated in FIG. 6, and the push-in jig 103 is made of a resin (such as nylon) that is relatively easy to deform. Because the push-in jig 103 has the slits or cuts, the collet portion of the push-in jig 103 is deformed inward along the tapered surface 101b, and the seal ring 1 can be pushed in to a straight portion of the feed port.

As illustrated in FIGS. 4 and 7, the discharge unit 104 includes the clamp 101c, a discharge table 108, a product receiving pipe 109, a core rod 110, and a pusher 111. The discharge table 108 is disposed below the annular gap, and a top surface of the discharge table 108 constitutes a discharge surface for the seal ring 1. The product receiving pipe 109 is disposed below the annular gap while being able to be lifted and lowered, and the product receiving pipe 109 receives the seal ring 1 discharged from the annular gap. The core rod 110 is disposed below the inner circumferential jig 102 while being able to be lifted and lowered, and the core rod 110 has an air passage through which air is delivered into the cavity 102a of the inner circumferential jig 102. The pusher 111 can move ahead and retreat along the discharge surface of the discharge table 108. The pusher 111 pushes out the seal ring 1, which is lowered to a discharge level while supported by the product receiving pipe 109, onto the discharge surface, and the pusher 111 pushes out the seal ring 1 from the discharge surface such that the seal ring 1 drops on a counting rod 112 disposed beside the discharge table 108. The seal rings 1 pushed out from the discharge surface by the pusher 111 are stacked on and retrieved by the counting rod 112.

A discharge operation performed by the discharge unit 104 will be described below. The delivery of the air into the cavity 102a is stopped. Then, in the plural seal rings 1 stacked on the product receiving pipe 109, the adjacent seal ring lying directly on or next to the lowermost seal ring is clamped by the clamp 101c. The product receiving pipe 109 on which only the lowermost seal ring is loaded is lowered to a level at which the seal ring 1 can be discharged in the discharge surface of the discharge table 108. The core rod 110 is lowered to or below the discharge surface of the discharge table 108. Finally the pusher 111 pushes out the seal ring 1 to the counting rod 112. Thus, the discharge of the seal ring 1 is completed.

(Shape Forming Method) In a seal-ring shape forming method of the first embodiment, the seal ring 1 is fitted into the annular gap between the outer circumferential jig 101 and the inner circumferential jig 102 from one of sides of the annular gap, the seal ring 1 is passed through the two regions maintained at predetermined temperatures in the annular gap, and the seal ring 1 is discharged from the other side of the annular gap, thereby forming the shape.

The push-in jig 103 pushes the seal ring 1 into the annular gap (first process). At this point, because the enlarged-diameter state in which the abutment joint ends are separated from each other is a shape in a natural state (state in which an external restraint is not applied) of the seal ring 1, the seal ring 1 is fitted into the annular gap so as to be brought into contact with the inner circumferential surface of the hole portion 101a of the outer circumferential jig 101 having the same diameter as the target outer diameter of the seal ring 1. The seal rings 1 are continuously pushed in the annular gap, and the subsequent seal ring 1 pushes the preceding seal ring 1, whereby the plural seal rings 1 move continuously ahead in the annular gap.

The seal ring 1 fitted into the annular gap is passed through the heating region of the annular gap while brought into contact with the inner circumferential surface of the hole portion 101a of the outer circumferential jig 101 (second process). In the heating region, the cartridge heater 105a heats and maintains the outer circumferential jig 101 at a temperature higher than a glass transition temperature of the resin material for the seal ring 1, and the cartridge heater 106a heats and maintains the inner circumferential jig 102 at the temperature higher than the glass transition temperature of the resin material for the seal ring 1. Accordingly, the passed seal ring 1 is heated at the temperature higher than the glass transition temperature of the resin material for the seal ring 1. For example, the heating temperature is set at 180 degrees Celsius in the case of the PEEK seal ring 1 having an outer diameter of 47 mm and a thickness of 2 mm.

The seal ring 1 passed through the heating region is passed through the cooling region (third process). In the cooling region of the annular gap, the cooling jacket 107 cools and maintains the outer circumferential jig 101 at a temperature lower than the glass transition temperature of the resin material for the seal ring 1. For example, the cooling temperature is set at 25 degrees Celsius that is lower than the glass transition temperature of 143 degrees Celsius in the case of the PEEK seal ring 1 having the outer diameter of 47 mm and the thickness of 2 mm. The inner circumferential jig 102 is set at a temperature lower than that of the heating region by the air delivered to the cavity 102a.

In the seal ring 1 proceeding into the cooling region, the outer circumferential surface side is brought into contact with the inner circumferential surface of the hole portion 101a of the outer circumferential jig 101 and rapidly cooled. At this point, the inner circumferential surface side of the seal ring 1 is maintained at a high temperature because the gap exists between the inner circumferential surface side of the seal ring 1 and the inner circumferential jig 102. In the seal ring 1 whose outer circumferential surface side is cooled at a temperature lower than the glass transition temperature of the resin material for the seal ring 1, density on the outer circumferential surface side is lowered relative to density on the inner circumferential surface side, thereby increasing a curvature, that is, decreasing the diameter of the seal ring 1. Therefore, the inner circumferential surface of the seal ring 1 is brought close to the outer circumferential surface of the inner circumferential jig 102.

The inner circumferential surface side of the seal ring 1 is maintained at the high temperature immediately before brought close to the inner circumferential jig 102. However, when the inner circumferential surface side of the seal ring 1 is brought close to the inner circumferential jig 102, the inner circumferential surface side is rapidly cooled to lower the density. Therefore, a difference in density is reduced between the inner circumferential surface side and outer circumferential surface side of the seal ring 1, and the diameter of the seal ring 1 is slightly enlarged. The seal ring 1 is completely cooled in that condition to end the shape formation process.

A time to discharge the product was about 340 seconds when the PEEK product having the outer diameter of 47 mm and the thickness of 2 mm was put in the shape forming apparatus having a heating region distance of 65 mm and a cooling region distance of 100 mm. A time to reach the predetermined temperature after the product was put in the apparatus was 1 to 2 minutes.

When attention is focused on the abutment joint portion 10 of the seal ring 1, because the outer circumferential surface of the seal ring 1 is brought into contact with the inner circumferential surface of the hole portion 101a of the outer circumferential jig 101 during the heating process, the outer diameter of the abutment joint portion 10 is maintained at the target outer diameter, and the abutment joint ends 10a and 10b face each other with the predetermined gap. During the cooling process, when the outer circumferential surface side of the seal ring 1 is cooled to reduce the diameter of the seal ring 1, the gap between the abutment joint ends 10a and 10b is narrowed, sometimes the abutment joint ends 10a and 10b are brought into contact with each other. However, when the inner circumferential surface side of the seal ring 1 is cooled thereafter to enlarge the diameter of the seal ring 1 again, the gap between the abutment joint ends 10a and 10b is also expanded again.

When the seal rings are continuously fed into the shape forming apparatus, in order to prevent interference between the abutment joint ends of the adjacent seal rings, the seal rings are continuously fitted such that the positions of the abutment joint portions 10 of the adjacent seal rings are shifted from each other, for example, such that the positions of the abutment joint portion 10 and the region opposite to the abutment joint portion are mutually replaced.

Advantage of First Embodiment

In the first embodiment, the seal ring is fitted into the annular gap between the outer circumferential jig and inner circumferential jig, these two jigs have the two regions maintained at the predetermined temperatures, and the specific shape of the seal ring is easy to form by passing the seal ring from one of sides of the annular gap to the other side. Consequently, the shape forming work of the plural seal rings can be performed continuously by fitting seal rings into the annular gap continuously. Accordingly, the automation of the work is achieved while the working efficiency is improved, and the seal-ring shape forming method, seal-ring shape forming apparatus, and seal ring of the first embodiment can contribute to the mass production of the seal-ring.

In the first embodiment, because all the seal rings are heated and cooled in the same temperature environment, the difference in thermal history is prevented among the products, and the variation in seal-ring shape is prevented among the products after the shape forming. Accordingly, the dimensional accuracy of the seal ring can be improved.

In the first embodiment, the abutment joint ends are prevented from being completely cooled while brought into contact with each other, and the abutment joint ends are prevented from being fixed to each other.

In the first embodiment, the seal ring is not brought into contact with the inner circumferential jig in the final process for forming the shape, so that the seal ring can relatively easily be taken out from the annular gap. Accordingly, high efficiency of the shape forming work can be achieved.

As described above, in the first embodiment, the efficiency and accuracy of the seal-ring shape forming process are improved.

Second Embodiment

Figure 8:
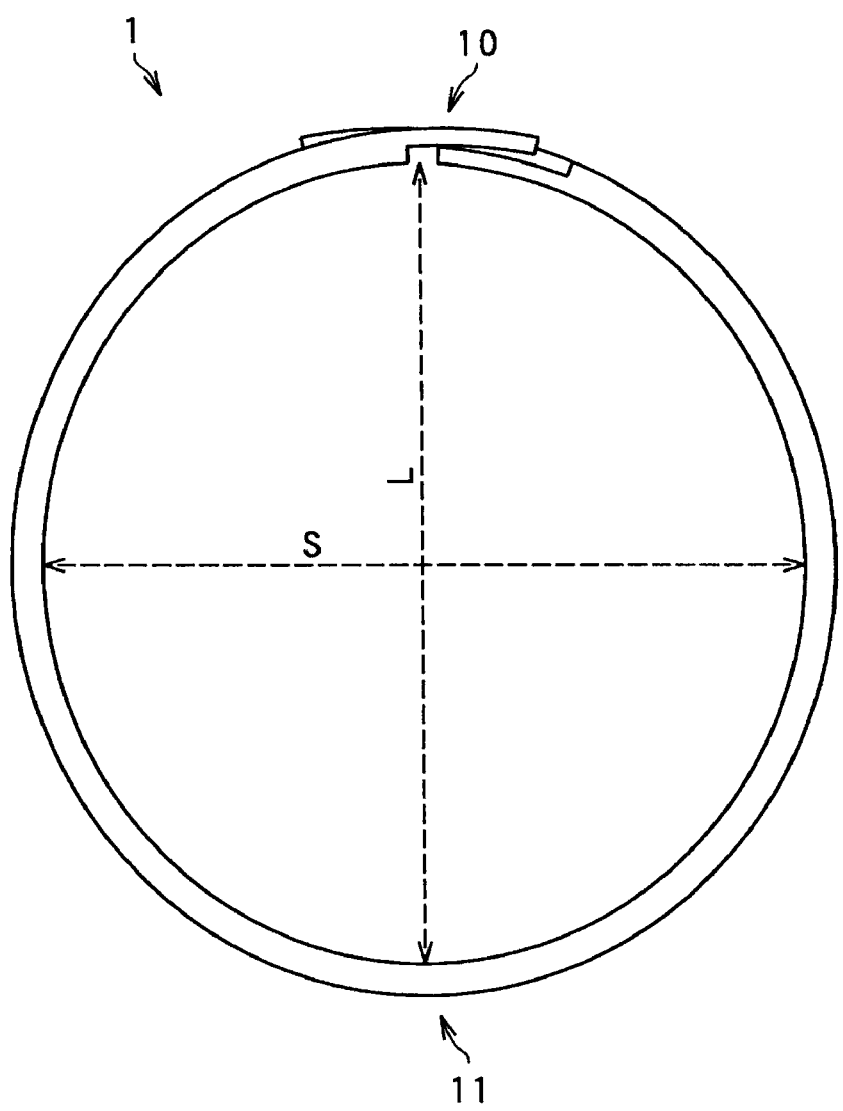
FIG. 8 is a schematic diagram illustrating a shape of the seal ring of the first embodiment after the shape forming.
Figure 9:
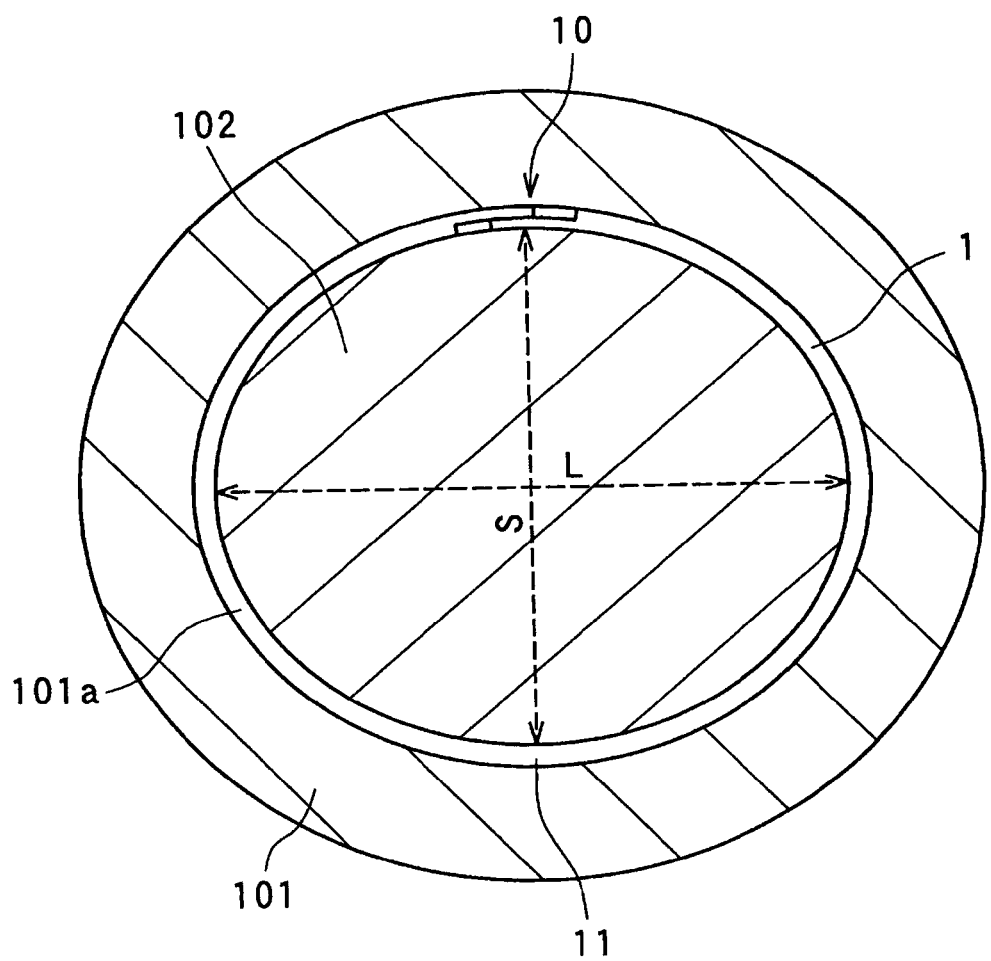
FIG. 9 is a schematic diagram illustrating a configuration of a shape forming apparatus according to a second embodiment of the invention.
Figures 10A, 10B:
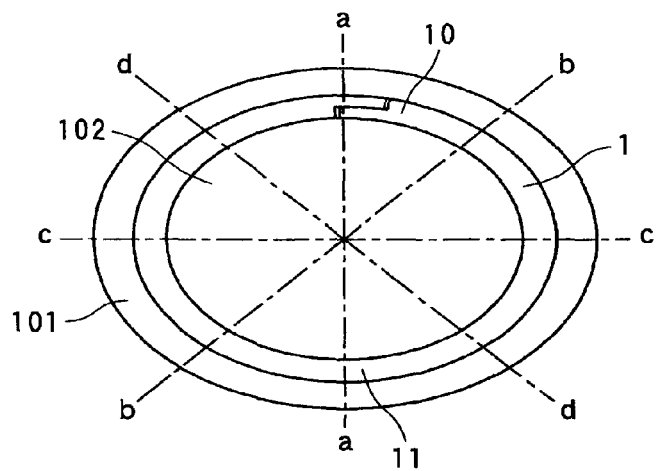
FIGS. 10A and 10B are schematic diagrams illustrating an evaluation test for a shape of the seal ring after the shape forming.

A seal-ring shape forming method, a seal-ring shape forming apparatus, and a seal ring according to a second embodiment of the invention will be described with reference to FIGS. 8 to 10. FIG. 8 is a schematic diagram illustrating a shape of the seal ring of the first embodiment after the shape forming. FIG. 9 is a schematic diagram illustrating a configuration of a shape forming apparatus according to a second embodiment of the invention. FIGS. 10A and 10B are schematic diagrams illustrating an evaluation test for the shape of the seal ring after the shape forming, FIG. 10A is a schematic diagram illustrating outer diameter measuring points, and FIG. 10B is a table illustrating a test results. While only a point different from that of the first embodiment is described, the common configuration is designated by the same numeral, and the description is not repeated.

The second embodiment differs from the first embodiment in the following points. That is, in order that a section perpendicular to the axis of the annular gap is a substantially ellipsoidal shape, the inner circumferential surface of the hole portion 101a of the outer circumferential jig 101 is formed into an ellipsoidal shape, and the outer circumferential surface of the inner circumferential jig 102 is formed into the ellipsoidal shape or round shape.

In the injection molding of the seal ring 1, in case that the mold has two gates, by which the resin materials is injected into the cavity of the mold, respectively provided near the regions for molding the abutment joint ends 10a and 10b, the resin material injected via one of two gates and the resin material injected via the other of two gates are merged at a region in the cavity of the mold for molding a region 11 of the seal ring 1 opposite to the abutment joint portion 10. Therefore, when the seal ring 1 is deformed such that the abutment joint portion 10 is closed after the molding, a strain remains in the region 11. Under such conditions, even if the seal ring 1 is fixed in the substantially round shape and heated to the temperature higher than the glass transition temperature, after being discharged from the shape forming apparatus, the seal ring 1 is deformed into the ellipsoidal shape such that the region 11 is set to a base point and the abutment joint portion 10 is set to an end point of a major axis L, by the residual stress (see FIG. 8). The seal ring 1 formed into such ellipsoidal shape has a risk such that the abutment joint portion 10 and the region 11 opposite to the abutment joint portion 10 of the seal ring 1 attached to the shaft come into contact with the edge around the opening of the shaft hole of the housing and interfere with the assembling of the shaft into the shaft hole of the housing.

As illustrated in FIG. 9, in the second embodiment, the sections perpendicular to the axes of the inner circumferential surface of the hole portion 101a of the outer circumferential jig 101 and the outer circumferential surface of the inner jig 102 are formed into the substantially ellipsoidal shapes, and the section perpendicular to the axis of the annular gap is formed into the substantially ellipsoidal shapes. Accordingly, in the second embodiment, the seal ring 1 moves in the substantially-ellipsoidal annular gap to form the shape. The seal ring 1 is fitted into the annular gap such that the positions of the abutment joint ends 10a and 10b are substantially matched with the position of one of end points of a minor axis S in the ellipsoidal section of the annular gap (such that a line connecting the abutment joint portion 10 and the region 11 opposite to the abutment joint portion 10 is substantially matched with the ellipsoidal minor axis S). For the outer circumferential surface of the inner circumferential jig 102, the section perpendicular to the axis may be formed into the round shape.

When the seal rings are continuously fed into the shape forming apparatus, in order to prevent the interference between the abutment joint ends of the adjacent seal rings, the seal rings are continuously fitted such that the positions of the abutment joint portions 10 and the region 11 of the adjacent seal rings are mutually replaced, that is, such that the abutment joint portion 10 of one of seal rings 1 and the region 11 of the other seal ring 1 are adjacent to each other.

The seal ring 1 is passed through the substantially-ellipsoidal annular gap to perform the heating and cooling processes, and the seal ring 1 is discharged from the annular gap. Then the seal rings 1 is deformed such that the abutment joint portion 10 and region 11, which are located on the ellipsoidal minor axis S, move away from each other by the residual stress in the region 11 (such that the minor axis S is extended). Therefore, the shape of the seal ring 1 can be formed into the substantially round shape.

The dimensions of major axes L and minor axes S of the inner circumferential surface of the hole portion 101a of the outer circumferential jig 101 and the outer circumferential surface of the inner circumferential jig 102 are appropriately determined depending on the material or dimensions of the seal ring 1 or how much the seal ring 1 is deformed after the discharge, and so on.

The experiment was performed to compare the roundness of the seal ring to which the shape forming process was performed with the ellipsoidal outer circumferential jig having the major axis of 49.837 mm and the minor axis of 49.786 mm and the roundness of the seal ring to which the shape forming process was performed with the round outer circumferential jig having the diameter of 49.82 mm. Specifically the shape forming process was performed to each ten samples with the roundness type shape forming apparatus and the ellipsoidal type shape forming apparatus, and a free outer diameter of each sample was recorded after the shape was formed. As used herein, the free outer diameter shall mean an outer diameter of the seal ring in the state in which the external restraint is not applied. For each sample, a maximum value (MAX) and a minimum value (MIN) in four points a to d illustrated in FIG. 10A and an average value (AVE) of the four points a to d were recorded in the free outer diameter. Table of FIG. 10B collectively illustrates the average value and maximum value of above each value in the ten samples.

As illustrated in Table of FIG. 10B, in the case of the roundness type shape forming apparatus, there is a large variation in an outer diameter of the seal ring after the shape is formed (MAX=49.925 and MIN=49.789), and there is a large difference between an average (AVE=49.852) of the maximum value and an average (AVE=49.736) of the average value in an outer diameter. That is, it is found that the seal ring is formed into the ellipsoidal shape after the shape is formed.

On the other hand, in the case of the ellipsoidal type shape forming apparatus, there is a small variation in an outer diameter of the seal ring after the shape is formed (MAX=49.760 and MIN=49.708), and there is a small difference between an average (AVE=49.737) of the maximum value and an average (AVE=49.684) of the average value in an outer diameter. That is, it is found that the seal ring is formed into the substantially round shape after the shape forming.

When the shape of the seal ring is formed with the ellipsoidal type shape forming apparatus such that the abutment joint portion is located at the end point of the minor axis, it was able to be confirmed that the difference between the maximum value and the average value is decreased in the outer diameter of the seal ring to improve the roundness.

Advantage of Second Embodiment

In the second embodiment, the roundness of the seal ring can be improved after the shape is formed. The roundness of the seal ring is improved, so that the easiness of attaching the seal ring can be improved.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seal-ring shape forming apparatus by which a synthetic-resin seal ring is formed in a shape such that abutment joint ends of the seal ring face each other with a predetermined gap, the seal ring being molded such that the abutment joint ends are separated from each other, the abutment joint ends being provided at one point on a circumference of the seal ring and able to be joined to each other, the seal-ring shape forming apparatus comprising:

an outer circumferential jig having a hole portion; and
an inner circumferential jig that is disposed in the hole portion to form an annular gap between an inner circumferential surface of the hole portion and the inner circumferential jig, wherein a heating region and a cooling region are formed in the annular gap, the outer circumferential jig and the inner circumferential jig being maintained at a constant temperature higher than a glass transition temperature of a resin material for the seal ring in the heating region, the outer circumferential jig and the inner circumferential jig being maintained at a constant temperature lower than the glass transition temperature of the resin material for the seal ring in the cooling region, the seal ring is fitted into the annular gap while the abutment joint ends face each other with a substantially predetermined gap, and the seal ring is sequentially passed through the heating region and the cooling region to form the shape.

2. A seal-ring shape forming apparatus according to claim 1, wherein an outer diameter of the inner circumferential jig is set such that a gap is formed between the outer circumferential surface of the inner circumferential jig and the seal ring in which the abutment joint ends face each other with the predetermined gap.

3. A seal-ring shape forming apparatus according to claim 1, wherein the annular gap is opened on both sides of the outer circumferential jig and the inner circumferential jig in an axial direction, the heating region is provided on one of the sides in the axial direction, and the cooling region is provided on the other side in the axial direction, and the seal ring is fitted into the opening on one of the sides in the axial direction of the annular gap, and discharged from the opening on the other side in the axial direction.

4. A seal-ring shape forming apparatus according to claim 1, wherein the plurality of seal rings are continuously fitted into the annular gap, and the preceding seal ring is pushed by the subsequent seal ring to move the plurality of seal rings in the annular gap.

5. A seal-ring shape forming apparatus according to claim 1, wherein the annular gap is substantially ellipsoidal in shape when viewed in cross-section such that the annular gap includes a major axis and a minor axis in directions perpendicular to an axis of the inner and outer circumferential jigs, and the seal ring is fitted into the annular gap such that positions of the abutment joint ends of the seal ring are substantially matched with a position of one of a pair of end points of the minor axis of the annular gap.

* * * * *

UNITED STATES PATENT AND TRADEMARK OFFICE
CERTIFICATE OF CORRECTION

PATENT NO. : 8,342,835 B2
APPLICATION NO. : 13/546240
DATED : January 1, 2013
INVENTOR(S) : Atsushi Fukushima et al.

It is certified that error appears in the above-identified patent and that said Letters Patent is hereby corrected as shown below:

On the title page item (73), delete "Nok Corporation" and insert therefor --NOK Corporation--.

Signed and Sealed this
Thirtieth Day of April, 2013

Teresa Stanek Rea
*Acting Director of the United States Patent and Trademark Office*